United States Patent [19]
Baylor et al.

[11] Patent Number: 6,148,375
[45] Date of Patent: Nov. 14, 2000

[54] HIERARCHICAL BUS SIMPLE COMA ARCHITECTURE FOR SHARED MEMORY MULTIPROCESSORS HAVING A BUS DIRECTLY INTERCONNECTING CACHES BETWEEN NODES

[75] Inventors: Sandra Johnson Baylor, Ossining; Yarsun Hsu, Pleasanville, both of N.Y.

[73] Assignee: International Business Machines Corporation, Armonk, N.Y.

[21] Appl. No.: 09/023,754

[22] Filed: Feb. 13, 1998

[51] Int. Cl.[7] .................................................. G06F 12/00
[52] U.S. Cl. ............................ 711/130; 711/145; 709/213
[58] Field of Search ................................. 711/119, 120, 711/121, 122, 130, 141, 144, 145, 146, 147, 3; 709/213, 214, 216, 217, 218

[56] References Cited

U.S. PATENT DOCUMENTS

| | | | |
|---|---|---|---|
| 4,622,631 | 11/1986 | Frank et al. | 364/200 |
| 5,297,269 | 3/1994 | Donaldson et al. | 395/425 |
| 5,394,555 | 2/1995 | Hunter et al. | 395/800 |
| 5,784,614 | 7/1998 | Davis | 395/672 |
| 5,802,563 | 9/1998 | Hagersten et al. | 711/122 |
| 5,835,950 | 11/1998 | Cho et al. | 711/144 |
| 5,878,268 | 3/1999 | Hagersten | 395/800.28 |

*Primary Examiner*—Eddie P. Chan
*Assistant Examiner*—Kevin Verbrugge
*Attorney, Agent, or Firm*—Douglas W. Cameron; Ronald L. Drumheller

[57] ABSTRACT

A method of maintaining cache coherency in a shared memory multiprocessor system having a plurality of nodes, where each node itself is a shared memory multiprocessor. With this invention, an additional shared owner state is maintained so that if a cache at the highest level of cache memory in the system issues a read or write request to a cache line that misses the highest cache level of the system, then the owner of the cache line places the cache line on the bus interconnecting the highest level of cache memories.

3 Claims, 3 Drawing Sheets

HIERARCHICAL BUS SIMPLE COMA ARCHITECTURE FOR SHARED MEMORY MULTIPROCESSORS HAVING A BUS DIRECTLY INTERCONNECTING CACHES BETWEEN NODES

TECHNICAL FIELD

This invention describes a method and apparatus for maintaining cache coherency in a multilevel shared memory multiprocessor system.

DESCRIPTION OF THE PRIOR ART

Shared memory multiprocessors are very popular due to their ease of programming and improved performance. In fact, there are many commercially available shared-memory multiprocessors consisting of a number of processors (up to 16 or 32) interconnected via a single bus with memory and associated disks. The processors typically have private caches associated with them and the shared-memory multiprocessor is cache coherent using a bus-based coherence protocol. This architecture is rapidly becoming a single component in scalable shared-memory multiprocessors consisting of a plurality of nodes interconnected by a multistage interconnection work (MIN) [1] and where each node is itself a 16 to 32 node shared-memory multiprocessor. This type of shared-memory multiprocessor architecture suffers from potentially prohibitive access latencies to data that is not present on a single node. One solution to this problem is to use the memory on each node as a higher-level cache, resulting in a cache-only memory architecture [2] This type of architecture facilitates the automatic migration and replication of data to nodes on demand.

A major problem with COMA architectures is expensive and complex hardware; however, a Simple COMA architecture [3] has been proposed to minimize this problem In Simple COMA, the paging software manages cache space allocation and deallocation at the paging level and less complex hardware is used to maintain cache coherence. However, cache coherence maintenance across nodes is directory based so the penalties associated with data accesses and control across nodes may be substantial (although the frequency of such accesses is likely to be reduced).

SUMMARY OF THE INVENTION

It is an object of this invention to minimize latencies associated with cache misses that result in node hops in scalable shared-memory multiprocessor systems.

It is another object of this invention to provide a cost effective method of building scalable shared-memory multiprocessors without the need for coherent directories.

Accordingly, this invention provides a method of maintaining cache coherency across multilevels of caches in a shared memory multiprocessor system having a plurality of nodes, where each node is a shared memory multiprocessor. With this invention status owner information is maintained for each line in the highest level of cache memory in the system, where the status information indicates which of the nodes of a read only line first read the read only line, and where the status information also indicates which of the nodes of a read/write line either first read the read/write line or last modified the read/write line, where the indicated node for each cache line is the node which owns the cache line. If a cache of one of the nodes of the highest level of cache memory in the system issues a read command or a write access command to a line that misses in the highest level cache of the system, then the owner of the cache line places the cache line on a bus interconnecting the highest level of cache memories, where the issuing cache reads or modifies, respectively, its cache line using the cache line placed on the bus by the owner of the line.

DESCRIPTION OF THE PREFERRED EMBODIMENT

Figure 1:
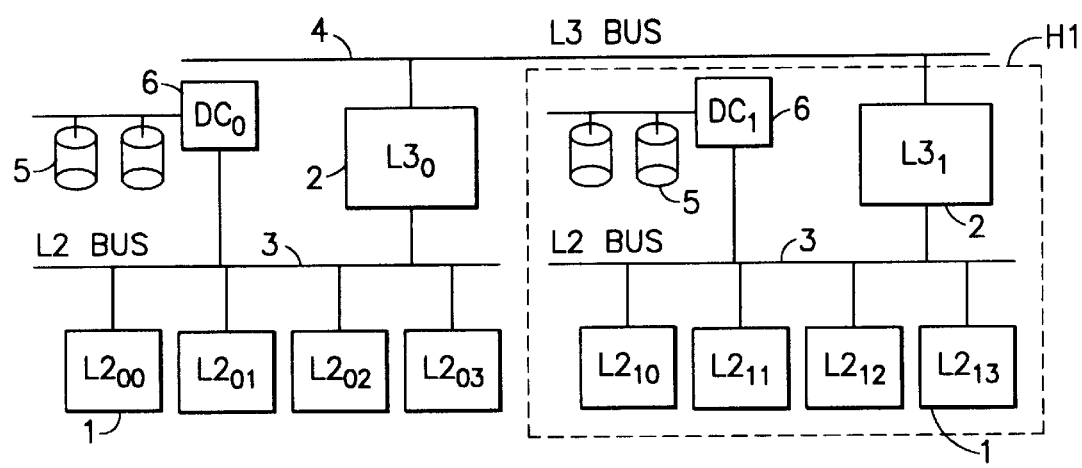
FIG. 1 schematically illustrates the hierarchical bus simple COMA architecture used in this invention.
Figure 2:
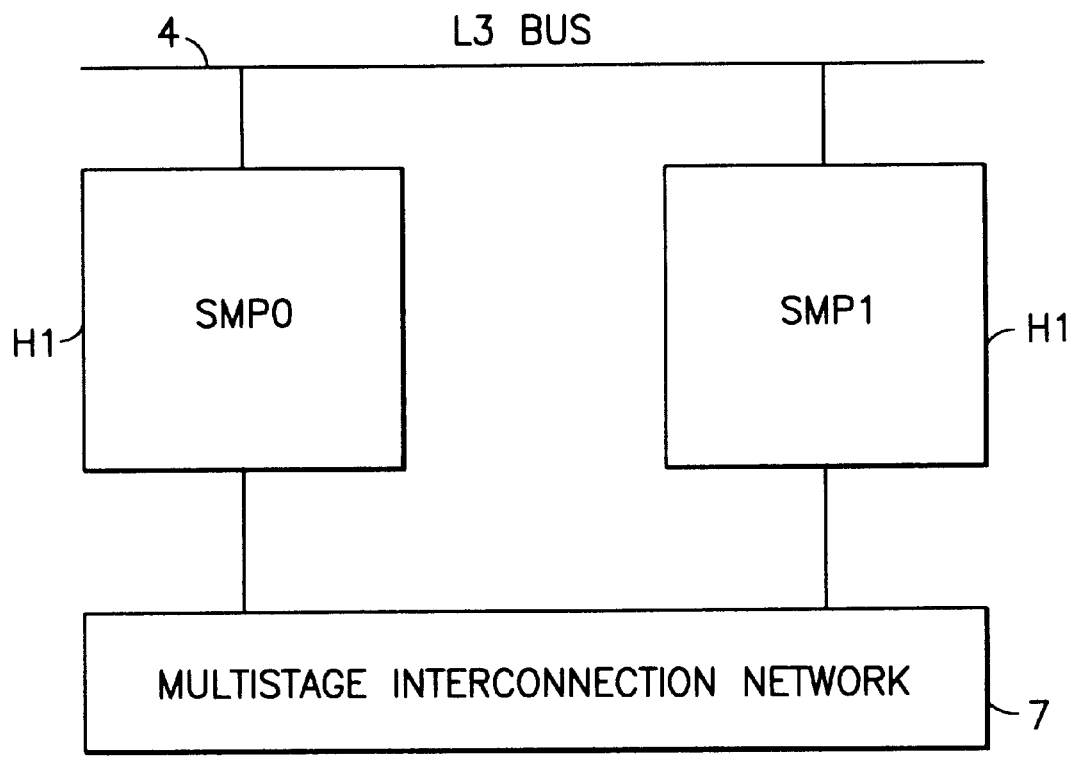
FIG. 2 schematically illustrates the hierarchical bus multistage interconnection network architecture used in this invention.

Presented in FIG. 1 is a logical diagram of a 2-node shared-memory multiprocessor system with each node itself a 4-node shared-memory multiprocessor H1. The caches 1 and 2 are shown in this node, and the lower-level L2 caches 1 are assumed to be associated with a processor. While this simple COMA architecture does not include a main memory, disks 5 and an associated disk controller 6 are assumed to be physically resident on a node H1 (denoted the disks' home node). The basic difference between the protocol activity for the two proposed architectures (bus-only (FIG. 1) and bus/MIN (FIG. 2)) is the fact that the bus-only (FIG. 1) uses the inter-node bus 4 for both control and data transfer while the bus/MIN architecture (FIG. 2) uses the inter-node bus 4 for control and the inter-node MIN 7 for data transfer. Most of the coherence activity needed for these two proposed architectures are identical. We therefore focus our discussion on the bus-only architecture proposal (FIG. 1); however, protocol activity for the bus/MIN architecture (FIG. 2) is specified and discussed when it differs from the bus-only protocol activity.

To maintain cache coherence, both the L2 (1) and L3 (2) caches contain state information on each cache line entry. It is assumed that the coherence protocol is the generic M, E, S, I (for modified, exclusive, shared, invalid) protocol. For the L2 cache 1, this generic protocol can be used along with a typical hierarchical bus protocol [4] Since there is no notion of main memory in our proposal, an additional state, denoted the shared owner state, is used to specify the owner of a read-only line. When there is a request to transfer a cache line to a cache on a read miss, the owner of the line will supply the data. If a line is in the modified, exclusive, or shared owner states, the cache containing the line is its owner.

The substance of our proposal are the special actions required when implementing the L3 coherence protocol on a hierarchical bus simple COMA architecture. For example, the cache replacement strategy becomes a page replacement strategy, and this invention describes how this page replacement strategy is integrated with the L3 cache coherence.

Figure 3:
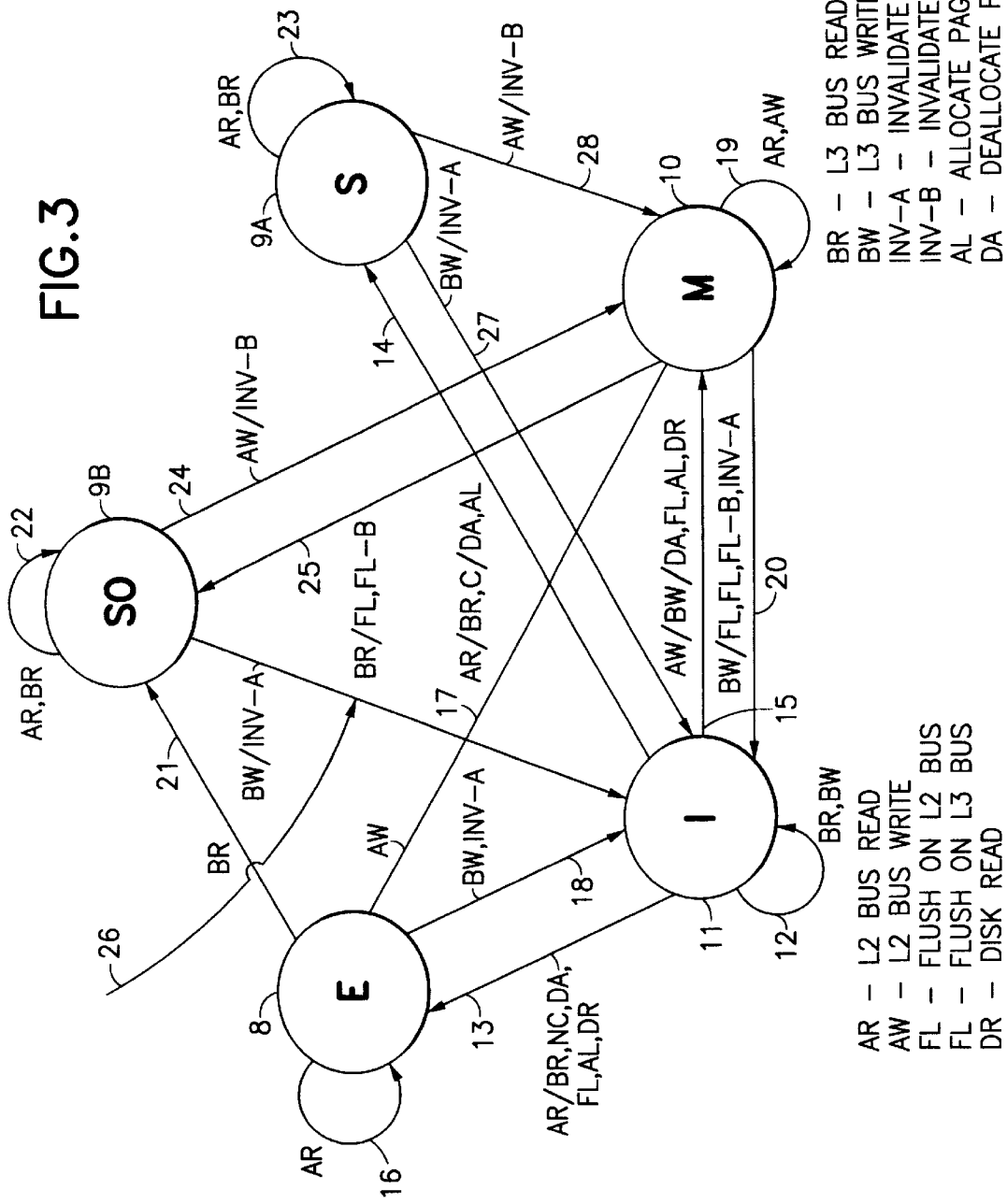
FIG. 3 schematically illustrates the cache coherence state diagram in accordance with the invention.

An L3 cache line can be in one of five states as outlined below and as illustrated in FIG. 3.

E—exclusive (8). The line is only resident in the L3 cache (2) and/or its associated lower-level caches and it has not been modified.

SO—shared owner (9B). The line is resident in several L3 caches (2), and the line has not been modified. This cache line is placed on this L3 bus (4) whenever a remote L3 cache (2) has a miss for the line.

S—shared (9A). The line is resident in several L3 caches (2), and it has not been modified.

M—modified (10). The line is only resident in the L3 cache (2) and/or its associated lower-level caches, and it has been modified.

I—invalid (11). Space has been allocated for the line in the cache; however, the data is invalid, or space has not been allocated in the cache for the line.

It is possible to combine the exclusive and modified states into one state.

There are several events that may trigger coherence action in the L3 cache (2). They include an L2 bus read (AR) or write (AW), an L3 bus read (BR) or write (BW), an L2 or L3 invalidation (INV-A and INV-B, respectively), and an L3 cache flush (FL-B). Since we are assuming a Simple COMA architecture, if space has not been allocated for an L3 cache line, then space has also not been allocated for the page which contains the line. Therefore, a page miss requires the initiation of the page replacement strategy and the processing of L2 and L3 cache misses. See page replacement discussion below. Described below are the actions taken as a result of these events when the L3 cache line is in one of the five states described below. See FIG. 3.

Invalid (I)11. If the line is in the invalid state and an L3 bus read (BR) or write (BW) occurs, the line will remain in the I state. See 12 in FIG. 3. If an L2 bus read (AR) occurs, then the L3 cache 2 will place a bus read signal on the L3 bus 4 to request the data if space is already allocated in the cache. If space has not been allocated, then the page replacement strategy is executed (allocating the requested page) and then the data is transferred to the L3 cache from the owner. Also as a result of an L2 bus read (AR), the state of the L3 cache line is changed to E (8) if no other cache has a copy of the line (See AR/BR on line 13) or S (9A) if a copy exists in at least one remote L3 cache (the owner). See AR/BR on line 14. If an L2 cache write occurs, then the L3 cache places a read-with-intent-to-modify signal on the L3 bus 4. This results in a data transfer from a remote L3, the owner cache, to the requesting L3 cache and an invalidation signal on the L3 bus 4. As a result of the invalidation signal, if any remote node has a copy of the line, then that line will be invalidated. Finally the state of the cache line is changed to M (10) as a result of the L2 cache (1) write (AW) and the L3 cache becomes the exclusive owner of the line. See AW line 15.

A read-with-intent-to-modify signal is the typical type of signal used to inform remote caches that a given cache is about to modify data. It also lets these caches know that is does not have a valid copy of the data so that it can obtain a valid copy of the data (in this case from a remote L3 cache) and then modify its copy.

Exclusive (E) (8). If an L2 bus read (AR) occurs while in this state the L3 cache line will remain in this state. See line 16. If an L3 bus read (BR) occurs while in this state, then the state of the L3 cache line is changed to SO (See line 21.), and the L3 cache will transfer the line to the requesting L3 cache. If an L2 bus write occurs, then the state of the L3 line is changed to M (10). See line 17.

If an L3 read-with-intent-to-modify bus signal occurs, then the L3 cache will place an invalidation signal on the L2 bus to invalidate the cache line in the L2 caches (1). The L3 cache will also place the line on the L3 bus (4) to send to the requestor. The state of the line is changed to I (11). See BW,INV-A on line 18.

Shared owner (SO) (9B) or Shared (S) (9A). If an L2 or L3 bus read occurs while in these states the L3 cache line will remain in the respective state. See AR, BR on lines 22, 23. If the L3 cache line state is SO, then the L3 cache will transfer the L3 cache line data on the L3 bus to the L3 requestor as a result of the L3 bus read. If an L2 read-with-intent-to-modify bus signal occurs, then the L3 cache 2 places an invalidation signal on the L3 bus so that remote L3 copies may be invalidated. The state of the cache line is then changed to M (10). See lines 24 and 28. If an L3 read-with-intent-to-modify bus signal occurs, then the L3 cache 2 will place an invalidation signal on the L2 cache bus for the line. If the cache line is in the SO state, the L3 cache (2) will transfer the data to the requestor via the L3 bus, and the state of the line is then changed to I (11). See lines 26 and 27.

A shared owner is used to specify the owner of a line that is present in several caches at the same time (and therefore shared). This includes read-only lines as well as lines that may be modified (and therefore exclusively owned) at some point during its residency in the cache and shared at other times. If a read-write line is in any cache, then it is only present in that cache (there can only be one cache with a read-write copy of a line). Therefore, by default, that cache is the exclusive owner of the line. Now, if a subsequent node wants to read a line that is in the read-write state in a remote node, then the cache which has the exclusive copy of the line (the exclusive owner) will supply the data to the requesting cache. The state of the cache line in both caches will therefore be shared. This is because the line is now present in the cache of two nodes, and it is shared. If it was previously modified, however, once the cache which had the exclusive modified copy of the line transfers this modified line to the requesting cache that issued the read, the state of the line in both caches becomes shared. At this point, there are two caches with the same copy (a shared copy) of the line. In this situation, we are asserting that the cache that originally had the exclusive read-write copy of the line (and therefore was the exclusive owner) now becomes the shared owner of the line.

Modified (M) (10). If an L2 bus read (AR) or write (AW) occurs, then the L2 cache line is transferred to the requesting L2 cache 1 from the L2 cache owner of the line. If there is no L2 cache owner, the L3 cache 2 will supply the data. The state of the line is unchanged. See line 19. If an L3 bus read signal occurs, then a resulting L2 bus read will occur and a cache flush will transfer the modified data from the L2 cache (1) to the L3 cache (2). Next, the line is flushed onto the L3 bus (4) back to the requesting L3 cache (2). The state of the L3 cache line is changed to SO (9B). See line 20. If an L3 read-with-intent-to-modify bus signal occurs, the L3 cache (2) will place an invalidation signal on the L2 bus (3). This will result in a cache flush of the modified data from the L2 cache (1) to the L3 cache (2). Once the flush is transferred back to the L3 cache (2), it is then flushed onto the L3 bus (4) back to the requesting L3 cache (2). The state of the L3 cache line is changed to I (11). See line 20.

The page replacement strategy includes the deallocation of a page consisting of a number of cache lines in the L3 cache. The strategy also includes the allocation of a page that contains the cache line requested in the L2 (and therefore L3) cache. See DA on lines 13–15 in FIG. 3.

The first step in page deallocation requires the selection of a page to be deallocated (e.g. the least recently used or LRU page). Next, an invalidation signal is placed on the L2 bus for each line composing the page. Any lines modified in the L2 caches 1 are flushed back to the L3 cache 2 as a result of this invalidation signal. Also, all cache lines composing the page that are present in the L2 caches 1 are invalidated. Next, the modified and exclusive lines within the page to be deallocated must be written to a remote L3 cache that has the page allocated. If there are no remote L3 caches with the page allocated, then only the modified lines are written back to the home disk. To determine if a remote L3 cache has the page allocated, the global address of the first line of the page is placed on the L3 bus 4. (See discussion below for global address determination. This address is accompanied by an allocation inquiry or AI bus signal. If an L3 cache (2) has the page allocated, then it will raise an allocation flag on the bus. For the bus/MIN architecture (FIG. 2), the node identification is also placed on the bus. If a remote L3 cache has the page allocated, then all modified and exclusive copies of the cache lines in the page to be deallocated are transferred on the L3 bus 4 (or the MIN 7 for the bus/MIN architecture of FIG. 2), and the L3 cache 2 with the page allocated will get a copy of each modified and exclusive line. If several L3 caches 2 have the page allocated, then either one is randomly chosen to receive the modified copies of the lines or all of the remote L3 caches can receive the exclusive lines. The state of the lines transferred is M (10) and E (8) for the lines that were in the deallocated page in the modified and exclusive states, respectively, if only one remote L3 has the page allocated.

If several L3 caches have the page allocated, then the state of the modified lines will remain M (10) if only one L3 cache will obtain a copy of these lines. The state will change to S (9A) if all other L3 caches (2) receive a copy of the modified lines except that one of the L3 caches (2) will obtain a copy of the line in state SO). However, all L3 caches (2) with the page allocated will get a copy of the exclusive lines. As a result, the state of these lines will be S in the L3 caches. The cache that receives the modified lines will also get a shared owner SO (9B) copy of the exclusive lines (if there are no modified lines then one cache is chosen to get the exclusive line in the SO state).

If no remote L3 caches have the page allocated, then only the modified lines in the page to be deallocated are written back to the home disks or placed in the remote L3 cache of the home node. If the L3 cache that contains the deallocated page is located on the same node as the home disk, then the modified lines are written back to the disks 5. Otherwise, space is allocated in the remote L3 cache 2 of the node containing the home disk for the page containing the modified lines. The modified data is then transferred to this remote L3 cache 2. The modified page is marked with the highest replacement priority in the remote (home) L3 cache 2. Once the page has been chosen for deallocation in this remote L3 cache due to the implementation of the page replacement policy, the modified data is written back to the disks 5 on the node H1. We denote this methodology the modified line policy.

Upon completion of page deallocation, the new page is allocated in the L3 cache, and the process begins to transfer the line requested (and/or other lines within the page) into the cache. A bus read or write signal is placed on the L3 bus 4 for the requested line. If an L3 cache (2) has a copy of the cache line, it is transferred to the requesting L3 cache 2 via the bus (4) (single-bus architecture, FIG. 1) or the MIN (7) (bus/MIN architecture, FIG. 2). No other line transfers (for the remaining lines of the page) are needed. Therefore, space has been allocated for these remaining lines, but they are not resident in the cache. The state of these cache lines is therefore invalid (I) (11).

If there is no L3 cache with a copy of the cache line (and therefore no L3 cache with the associated page allocated), then the page is read in from the home disk. If the home disk is on the same node as the requesting L3 cache, then the page transfer from the disk 5 to the L3 cache will occur smoothly. If the home disk is on another node, then the page has to be allocated in the L3 cache of the disk home node (which may result in a page deallocation for that cache), and transferred from the home disk to the L3 cache of the disk home node. Then, the line requested is transferred from that L3 cache to the requesting L3 cache (single-bus architecture, FIG. 1). For the bus/MIN architecture (FIG. 2), it is not necessary to allocate the page in the L3 cache of the home disk node. The page can be transferred from the disk to a buffer, and then from the buffer to the remote L3 cache via the MIN.

In a simple COMA architecture, each individual SMP building block H1 (i.e., the SMP identified by the dashed box in FIG. 1) has its own address space. However, the entire machine must have a global address space to facilitate communication between the SMP building blocks H1. However, it is assumed that the virtual address space of an SMP block H1 is at least an order of magnitude larger than the disk capacity of the block. As a result, the virtual address space of each node can also be used as the global address space of the shared-memory multiprocessor system. It is assumed that this global address space is divided into N sub-address-spaces, where N is the total number of nodes in the system. Therefore, for a given page, the virtual address of that page maps to the same global address on each node.

Having thus described our invention, what we claim as new and desire to secure by Letters Patent is:

1. In a shared memory system having a plurality of nodes and a hierarchy of cache memories, where each node is a shared memory multiprocessor, a method of maintaining cache coherency in said system in response to read or write access commands, said method comprising:

a. maintaining status owner information for each line of a highest level of cache memory in said system, said status owner information indicating which of said nodes, of a read only line, first read said read only line and said status owner information indicating which of said nodes of a read/write line was a last node to have either first read said read/write line or to have last modified said read/write line, wherein each indicated node for each cache line is a node that owns said each cache line; and b. if a cache at one of said nodes at said highest level of cache memory in said system issues a read or write access to a line that misses in the highest level cache of said system then placing, by a node that owns latter said cache line, latter said cache line on a bus directly interconnecting said highest level of cache memories.

2. In a shared memory system having a plurality of nodes, where each node is a shared memory multiprocessor, a method of maintaining cache coherency across at least three levels of caches in said system, said method comprising:

a. maintaining status owner information for each line of a highest level of cache memory in said system, said status owner information indicating which cache of a read only line first read said read only line, and said status owner information also indicating which cache of a read/write line last modified said read/write line, said latter caches being owner nodes;

b. if a non-owning cache at said highest level of cache memory in said system issues a read access to said each line, then one of said owner nodes will place the cache line on a bus directly interconnecting said highest level of cache memories;

c. if a lower level cache of said system issues a write request to a cache line, the higher level cache sends an invalidation signal on the higher level bus to indicate that the information in said lower level cache is invalid and the higher level cache transfers data for said write request to the requester on said higher level bus; and d. changing the state of said higher level cache line in a node which owned said higher level cache line to invalid.

3. In a shared memory system having a plurality of nodes and a hierarchy of cache memories, where each node is a shared memory multiprocessor, a method of deallocating a page if a page miss occurs as a result of a cache line access in a highest level cache, said method comprising:

a. sending an invalidation signal to lower level caches for each line of said page;

b. if any of said lower level cache lines have modified said lines of said page then said modified line is transmitted to said highest level cache;

c. transferring all modified lines in said highest level cache to another highest level cache via a bus directly interconnecting said highest level caches; and d. allocating said page in said other highest level cache to provide space in said other higher level cache for storing each line of said page.

* * * * *